United States Patent [19]
Tyree, Jr.

[11] Patent Number: 4,498,306
[45] Date of Patent: Feb. 12, 1985

[54] REFRIGERATED TRANSPORT

[76] Inventor: Lewis Tyree, Jr., 145 Briarwood Ave. North, Oak Brook, Ill. 60521

[21] Appl. No.: 440,403

[22] Filed: Nov. 9, 1982

[51] Int. Cl.³ .............................................. F25D 15/00
[52] U.S. Cl. ........................................ 62/119; 62/165;
62/239; 62/384; 62/434; 165/104.21
[58] Field of Search ................. 62/119, 165, 384, 434,
62/239; 165/104.21

[56] References Cited
U.S. PATENT DOCUMENTS

2,187,569 1/1940 Henney ...................................... 62/6
2,727,361 12/1955 Morton ...................................... 62/3
3,693,370 9/1972 Miller ...................................... 62/175
3,783,633 1/1974 Glynn et al. ........................... 62/384
3,985,182 10/1976 Hara et al. .............................. 165/32

Primary Examiner—Ronald C. Capossela
Attorney, Agent, or Firm—Fitch, Even, Tabin & FLannery

[57] ABSTRACT

A refrigerated transport having an insulated enclosure and including a cryogen reservoir, e.g., high-pressure liquid cryogen or solid $CO_2$. A plurality of thermosyphons associated with the walls and floor of the enclosure adjacent the interior skin intercept heat attempting to enter the enclosure. An intermediate heat sink draws the intercepted heat from the upper portions of the thermosyphons. The temperature of the heat sink is thermostatically controlled in a manner that the rate at which heat from the heat sink is absorbed by the cryogen is regulated to maintain the heat sink within a desired temperature range such that the thermosyphons will in turn maintain the enclosure and its product load at the desired subambient storage temperature.

20 Claims, 26 Drawing Figures

REFRIGERATED TRANSPORT

The invention relates to refrigerated transports, and more particularly to improvements in refrigerated transport systems which are particularly advantageous when cryogens are relied upon for their cooling capacity. Products requiring refrigeration, particularly food, which may be either in the cooled or frozen state, are transported for long and short distances in insulated transports. The transports which are commonly used include railroad cars, truck-trailer combinations, straight trucks and insulated shipping containers, such as the type carried in the cargo section of an airplane or carried on flat-bed vehicles or the like.

BACKGROUND OF THE INVENTION

The use of cryogens, particularly carbon dioxide and nitrogen, has been investigated for a number of years for such in-transit refrigeration needs. Some of these systems have sprayed the cold vapor produced by the expansion of the liquefied gas directly into the product storage region, and examples of such systems are shown in U.S. Pat. Nos. 3,287,925, 3,446,028, 3,525,235 and 3,638,443. Other systems, such as those shown in U.S. Pat. Nos. 3,757,531 and 4,045,972, cause the cryogens to vaporize within a heat-exchanger located within the insulated storage chamber and then employ the expanding gases evolved from the evaporating liquid to drive an air-motor connected to a fan blade which directs air from the storage chamber past a heat-exchange coil. A somewhat related system utilizing the direct-injection of cryogen into an insulated storage chamber was embodied in the so-called "clip-on" units for containerized shipment exemplified by U.S. Pat. Nos. 4,033,140, 4,038,833 and 4,048,813.

A problem shared in common by these systems was that the arrangement had to be such that the air could circulate around and envelop the refrigerated load, otherwise the portion of the product which rested directly against the floor or against the walls would tend to become warm despite the fact that air at the top of the storage chamber was maintained within the desired temperature limits.

There were also some containers which were developed for shipping and/or storing perishable foods which relied upon the supply of a quantity of solid $CO_2$ to an upper chamber, and exemplary of such units are U.S. Pat. Nos. 3,800,554, 3,864,936 and 4,299,429. U.S. Pat. No. 3,561,226 extends this type of system to a delivery truck and employs a pair of elongated compartments which are filled with packed $CO_2$ snow by expanding liquid $CO_2$ through orifices at each end of these compartments. Still other patents show devices wherein liquid $CO_2$ or snow is employed to condense a refrigerant, and the condensed refrigerant is then allowed to enter an evaporator through a thermostatically controlled valve to supply the cooling needs within a storage chamber. Exemplary of these systems are U.S. Pat. Nos. 1,943,994, 1,959,994 and 3,225,558.

Still another attempt to overcome the basic problem of getting the cooling to the load is exemplified by U.S. Pat. No. 4,129,432 wherein a plurality of carbon dioxide containers are maintained, usually just below the roof of an insulated storage chamber; the pressure of the liquid $CO_2$ is controlled to maintain the uninsulated containers at a desired low temperature by venting $CO_2$ vapor as necessary. The cold, more dense atmosphere created adjacent the uninsulated containers is permitted to gravitate downward through passageways along the walls created by vertical ribs. Still another system of this type is shown in U.S. Pat. No. 3,308,630 wherein an insulated enclosure is provided which is cooled with a liquid cryogen, such as liquid nitrogen or liquid $CO_2$. The insulated enclosure is built with an elaborate system of ducts created in the walls, floor and ceiling at a region just adjacent the interior skin and thus separated from the outer skin by the thermal insulation material. The vaporizers are located in upper locations, and the cold vapor which is created, as well as the cooling of the compartment atmosphere adjacent the ceiling, causes cold fluid flow downward. The special structural requirements of the floor of such a system and the loss in storage space from the creation of the passageway network are considered to be substantial drawbacks to the commercialization of such a system. Accordingly, the search has continued for more effective cryogenic refrigeration systems for transports.

SUMMARY OF THE INVENTION

The invention provides an improved system for providing in-transit refrigeration which allows the achievement of precise temperature control throughout the entire storage chamber of the transport without the requirement of significant air-circulation space. The invention associates a plurality of thermosyphon units with the walls and floor. Each thermosyphon unit contains a vaporizable refrigerant selected to maintain the walls and floor at a desired temperature consistent with the characteristics of the product load by intercepting heat flowing into the storage chamber through these boundaries of the insulated transport. Upper portions of the thermosyphon units are cooled by an intermediate heat sink which is in turn maintained at a desired temperature, as by a thermostatically-controlled transfer of heat to a cryogen. The cryogen may be solid $CO_2$ or may be liquid $CO_2$, liquid nitrogen or the like which is expanded or evaporated under controlled conditions. Overall, the invention provides a simple, light, essentially fail-safe, passive system wherein damage to one heat-intercepting thermosyphon unit has no effect upon the remainder of the system and thus is particularly well suited for use in railway cars and truck trailers wherein relatively rough-handling conditions may occur.

DETAILED DESCRIPTION OF THE PREFERRED EMBODIMENTS

Illustrated in FIGS. 1 to 7 is a railroad car 11 of generally standard construction having a subframe 13, wheel assemblies 15 and a door 17. The car is designed to serve as a refrigerated transport, and thus all of the boundaries which constitute the enclosure wherein a refrigerated load will be transported are accordingly provided with thermal insulation. In this respect, the car has a pair of side walls 19, a pair of end walls 21, a floor 23 mounted on the subframe 13, and a ceiling or roof 25. The entire storage chamber 26 is defined by an interior skin 27, which constitutes the interior surface of the floor 23, the side and end walls 19, 21, and also the ceiling, and this skin may be plywood or the like. The exterior surfaces may be of any standard material, and the intermediate region is filled with thermal insulation material, preferably a synthetic resin foam 29 of a type well known in the insulation art.

Heat attempting to flow into the insulated chamber 26 must flow through one of the boundaries, i.e., the vertical walls, the floor or the roof, and generally the most critical boundary for the inward flow of heat is the floor 23. In order to maintain the storage chamber and the product it contains at a desired storage temperature, the heat is intercepted in these boundary regions and removed to a heat sink of one type or another and then ultimately preferably to the vaporizing cryogen from a cryogen reservoir which is provided for this purpose. More particularly, close and efficient control is achieved through the provision of thermosyphons 31 in the boundary regions, the upper portions of which are cooled by the heat sink, and in addition by preferably thermostatically controlling the temperature of the heat sink, the cooling of which is provided by the cryogen. Thermosyphons are known devices for achieving heat-transfer where a closed tube is provided wherein a two-phase, liquid-vapor refrigerant is confined, and the use of such thermosyphons is discussed, for example, in ASME Publication 81-HT-16. A suitable Freon or other refrigerant is chosen which has the desired physical characteristics at about the storage temperature involved, i.e. a two-phase form at an equilibrium pressure of not more than about 500 psia. and preferably not greater than about 300 psia.

Preferably, the thermosyphon tubes are filled to the desired level at about atmospheric pressure, and of course the pressure within them will change with the temperature. For present purposes, a refrigerant is chosen which for an intended storage temperature of, e.g. between about 40° F. (4.4° C.) and about $-20°$ F. ($-29.9°$ C.) has an equilibrium pressure between about 115 psia. and about 1 psia. When the product being shipped is to be maintained in a frozen state and is loaded into the storage chamber 26 at a temperature of about 0° F. ($-17.8°$ C.), R-22 might be used to maintain a storage temperature of about 5° to 10° F. If the product being shipped is to be maintained in a refrigerated state just above the freezing point of water, then a refrigerant having slightly different characteristics, such as R-502, might be used to maintain a storage temperature within the chamber between about 35° and 40° F.; however, either refrigerant can function in either temperature range.

Figures 2, 3, 4, 5:
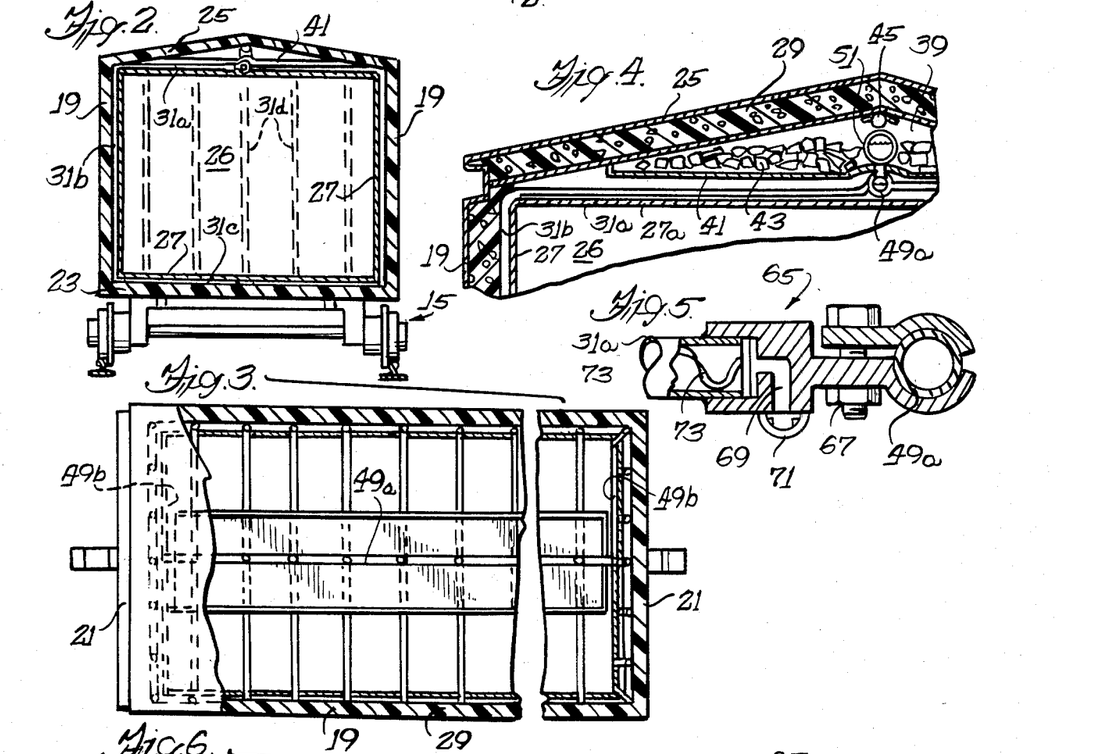
FIG. 2 is a sectional view of the railway car taken generally along line 2—2 of FIG. 1.
FIG. 3 is a plan view of the railway car of FIG. 1 with portions broken away and shown in section to illustrate the interior construction thereof.
FIG. 4 is an enlarged fragmentary sectional view showing some details of the refrigeration system not otherwise discernible from FIG. 2.
FIG. 5 is a further enlarged fragmentary view with portions broken away showing a connection between the upper end of one of the thermosyphons and the heat sink as generally depicted in FIG. 4.

In the railroad car 11, a plurality of thermosyphons 31 are employed. Those associated with the side walls 19, as best seen in FIG. 2, may be individually formed in the shape of a C having an upper horizontal leg 31a, a vertical intermediate leg 31b and a lower horizontal leg 31c,; however, the thermosyphons associated with the end walls preferably have straight vertical legs 31d. Opposite C's may also be connected to form an O as discussed hereinafter.

Figures 1, 7:
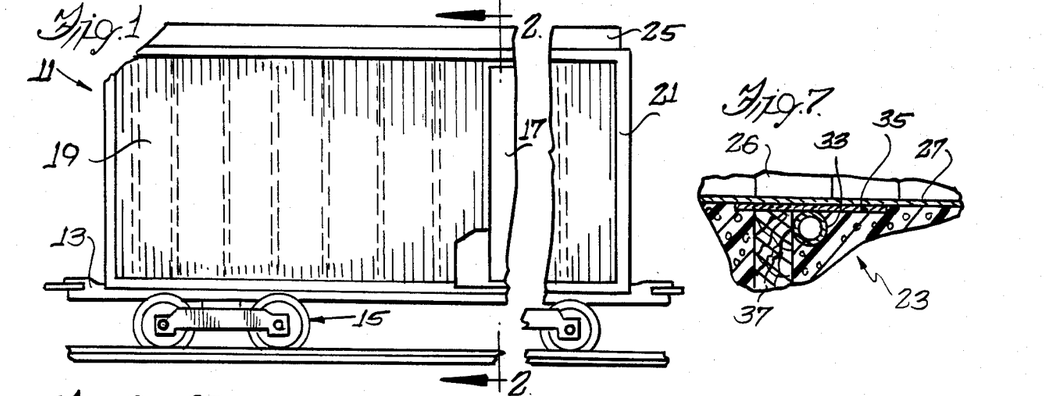
FIG. 1 is a fragmentary front view of a railway car embodying various features of the invention.
FIG. 7 is a fragmentary sectional view through the floor of the railway car of FIG. 1.

As best seen in FIG. 7, the thermosyphons 31 are formed by a composite tube-strip which constitutes a tube portion 33 connected to a strip or plate portion 35 by a good heat-conducting bond so as to render it essentially an integral composite. The tube 33 and the strip 35 are both formed of good thermal-conducting material, such as copper, and the integral bond may be formed by localized heating of the tube and the strip so as to cause localized melting and/or by the use of a suitable brazing material. The thermosyphons are located at spaced intervals throughout the entire boundary of the refrigerated chamber 26, and preferably the distance of separation is such that if one of the thermosyphons was damaged so as to result in refrigerant loss and thus thereafter fail to effectively operate, the flanking thermosyphons would compensate for it, assuring adequate refrigeration of this region of the transport was maintained.

The thermosyphons are located, as illustrated in FIG. 7, interior of the foam insulation 29 and with the strip 35 located along the interior skin 27 of the chamber. In addition, the thermosyphons 31 are positioned so that the copper strip 35 is in contact with the interior surface of each structural member, in this case a floor joist 37, and a similar arrangement is employed in the walls wherever structural studs are present. This arrangement accomplishes a dual purpose: first, the good heat-conducting copper strip 35 intercepts the major inflow of heat, which will be through the wooden structural members, leading the heat to the integral tube portion 33 of the thermosyphon and then to the refrigerant therewithin, and secondly it protects the tube 33 from potential damage and/or rupture because of the physical support from its presence at the location. A particular advantage of the invention lies in the fact that the floor can be constructed in a standard manner to withstand the anticipated weight of mechanical forklift equipment and heavy loads because the presence of the copper strip 35 between the joist 37 and the floor skin 27 has no structural deficiency—in contrast to earlier railroad car arrangements wherein it was required to provide an extensive passageway network beneath the floor skin through which air could be circulated by fans to effect the necessary cooling. If an aluminum floor skin were employed instead of plywood, the thermosyphon tubes might be bonded to the undersurface of the aluminum sheeting and the strip portion omitted in the floor region.

The cryogen reservoir for providing the cooling capacity for the railroad car 11 is located in the upper region just below the insulated roof 25. Preferably, this upper region 39 is closed by a protective upper skin 27a, although this could be omitted. Located within the upper compartment 39 is a thermal-conducting metal pan 41, preferably made of aluminum, which is designed to hold a reservoir 43 of solid $CO_2$. The solid $CO_2$ may be supplied to the aluminum pan 41 in any suitable manner; however, preferably an apertured spray pipe 45 is provided which has a coupling (not shown) at one end that extends exterior of the end wall 21 of the railway car 11 and allows connection to be made with a source of high-pressure liquid $CO_2$. Accordingly, the reservoir 43 is charged with solid $CO_2$ snow by expanding high-pressure liquid through the apertures in the spray pipe 45 to create $CO_2$ vapor and $CO_2$ snow in the desired amount. The vapor may be allowed to exit through the refrigerated chamber 26 and through the door 17 so as to effect some initial pre-cooling of the product load, or separate screened vents (not shown) can be provided to vent the $CO_2$ vapor either directly exterior of the railway car or through a desired location in one of the walls.

Figure 6:
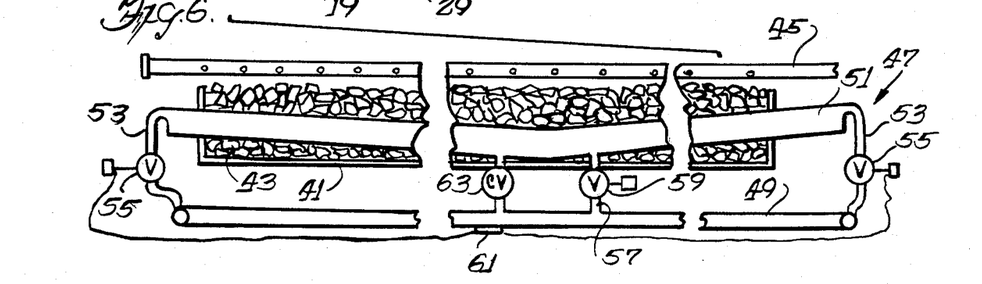
FIG. 6 is a diagrammatic view with portions broken away illustrating the heat sink and the cryogen reservoir.

An intermediate heat sink 47 is provided which is thermostatically regulated to remove heat in a controlled manner from the upper portions of the thermosyphons 31 and transfer it ultimately to the cryogen in the reservoir 43. The heat sink 47 includes a lower header 49 which is in the shape of a large H lying in a horizontal plane and which serves as an evaporator that is in fluid communication with an upper condenser 51 which is located within the region of the $CO_2$ reservoir 43 and which is in thermal contact with the aluminum pan 41. The heat sink 47 functions in the same general manner as a thermosyphon as it contains a desired quantity of a two-phase refrigerant, such as R-22, which is evaporated in the lower H-shaped header 49 and which is condensed in the upper condenser 51 by giving up its heat to the cold, solid cryogen 43 in the $CO_2$ reservoir, that is at a temperature of about $-110°$ F. ($-78.9°$ C.)

To regulate the flow of fluid between the condenser 51 and the evaporator 49, a pair of interconnections 53 are provided at each end, each of which contains a thermostatically controlled valve 55, which can be of the off-on variety but is preferably a modulating valve that will control the rate at which vapor from the evaporator 49 can return to the condenser. An interconnection is provided at each end of the heat sink so that, regardless of whether the railway car is on an upgrade, a downgrade, or level, vapor will be able to flow upward into the condenser when the valves 55 are open.

Simultaneous with the upward flow of vapor, downward replenishment of liquid refrigerant is accomplished by providing an interconnection 57 centrally between the ends which is controlled by a valve 59. The temperature of the evaporator 49 is monitored by a suitable sensor 61, and whenever the temperature rises above that desired, the valves 55 are caused to open to allow vapor to return to the condenser 51. The connections between the valves are such that whenever the valves 55 open, the valve 59 opens substantially the same amount. As a safety measure to prevent unexplained vapor build-up in the evaporator, a presure-regulating check valve 63 is provided in another interconnection to allow fluid to flow back up into the condenser 51 should the pressure within the evaporator 49 exceed certain preset limits.

The refrigerant in the condenser 51 is maintained at about $-110°$ F. because the aluminum pan 41 is in good thermal contact with the condenser 51, and accordingly, temperatures in the evaporator as low as about $-100°$ F. would be possible. However, because most frozen foods are transported at about $0°$ F., the operation of the valves 55 and 59 are employed to limit the rate at which liquid-phase refrigerant may flow to the evaporator 49 and to thereby maintain the temperature in the evaporator within a desired range. Generally, a thermosyphon unit is effective in maintaining a temperature along its length within about $5°$ to $15°$ F. of its cold-end temperature depending upon the heat flux. Accordingly, when frozen foods are being transferred, the temperature in the evaporator may be maintained between about $-1°$ F. and about $+1°$ F. For transportation of fresh foods, higher temperatures would generally be maintained in the evaporator 49. Generally and taking into consideration the temperature differential between the cold-end of the thermosyphon and its bottom, the heat sink will not be maintained more than about $15°$ F. below the storage temperature.

As best seen in FIG. 3, the evaporator 49 is in the shape of an H having a central main leg 49a and a pair of end legs 49b with the interconnections 53 from the condenser 55 being located at about the points of intersection between the different legs. As previously indicated, the H-shape of the evaporator brings it adjacent the upper ends of all of the thermosyphons 31. Preferably, a metallic coupling 65, made of a good heat-conducting material, such as copper, is provided to assure the efficient flow of heat from the thermosyphon 31 to the evaporator 49. Depicted in FIG. 5 is an enlarged view of a coupling 65 which receives the upper end of the thermosyphon and may be brazed or otherwise suitably connected thereto so as to be in good thermal conducting relationship therewith. The right-hand end of the coupling 65 is designed to clamp about the evaporator, i.e., the main leg 49a to which it would be tightly held by a bolt and nut combination 67 or the like. If desired, in order to allow refilling with refrigerant or checking the vapor pressure therewithin, a passage 69 is provided in the coupling 65 which communicates with a filling port and cap arrangement 71. An internal straight or spiral fin 73 can be provided within the upper end of the thermosyphon so as to increase the surface area and promote the condensation of the refrigerant vapor.

Shown in FIGS. 8 through 14 is an alternative embodiment of a railway car 75 which illustrates a design particularly useful for retro-fitting existing, refrigerated freight, railroad cars which contain a compartment in one end wherein mechanical refrigeration equipment has been heretofore located. Such cars can have their life extended by rebuilding and converting them to cryogenic refrigeration service. They might, for example, be particularly utilized in operations wherein freight is very heavy, such as in the shipment of barrels of frozen orange juice concentrate, wherein the additional cubage provided by the arrangement as shown in FIGS. 1 through 7 is not quite as important and the allowance for an end compartment is acceptable.

Figures 8, 14:
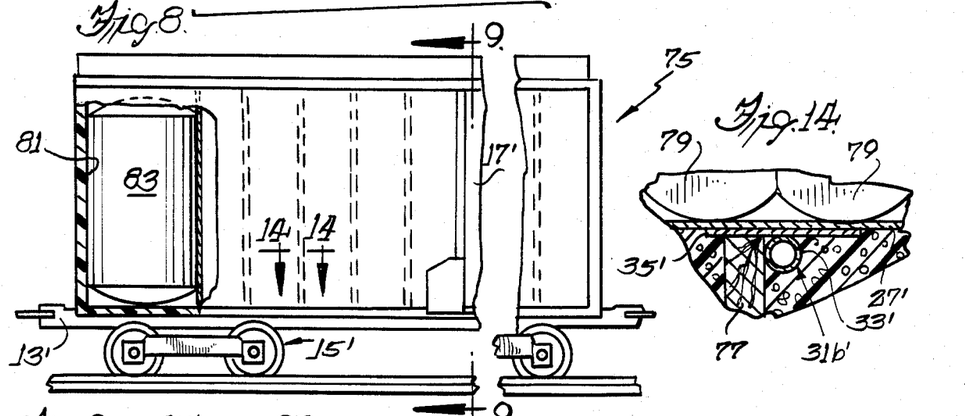
FIG. 8 is a view similar to FIG. 1 of an alternative embodiment of a railway car embodying various features of the invention.
FIG. 14 is a fragmentary sectional view through one of the walls of the railway car taken generally along the line 14—14 of FIG. 8.

More particularly, a railroad car 75 is depicted having components which are essentially the same as those in the railroad car 11 and which are therefore given the same reference numerals plus a prime. Thermosyphons 31' are similarly provided in the walls and in the floor at a location just inside the skin 27' as previously described. FIG. 14 illustrates the side wall construction wherein the thermosyphon 31', more particularly the vertical leg 31b' thereof is located with a portion of the strip 35' located between a vertical wooden structural member or stud 77 and the plywood interior skin 27' with the tube portion 33' lying thereadjacent. Located immediately interior of the skin are pair of barrels 79, which constitute an exemplary refrigerated product load. Instead of being horizontal as in the first embodiment shown in FIGS. 1 through 7, the upper portions 31a' of the thermosyphons follow the contour of the canted roof 25' for reasons to be explained hereinafter.

Figures 9, 10, 11, 12:
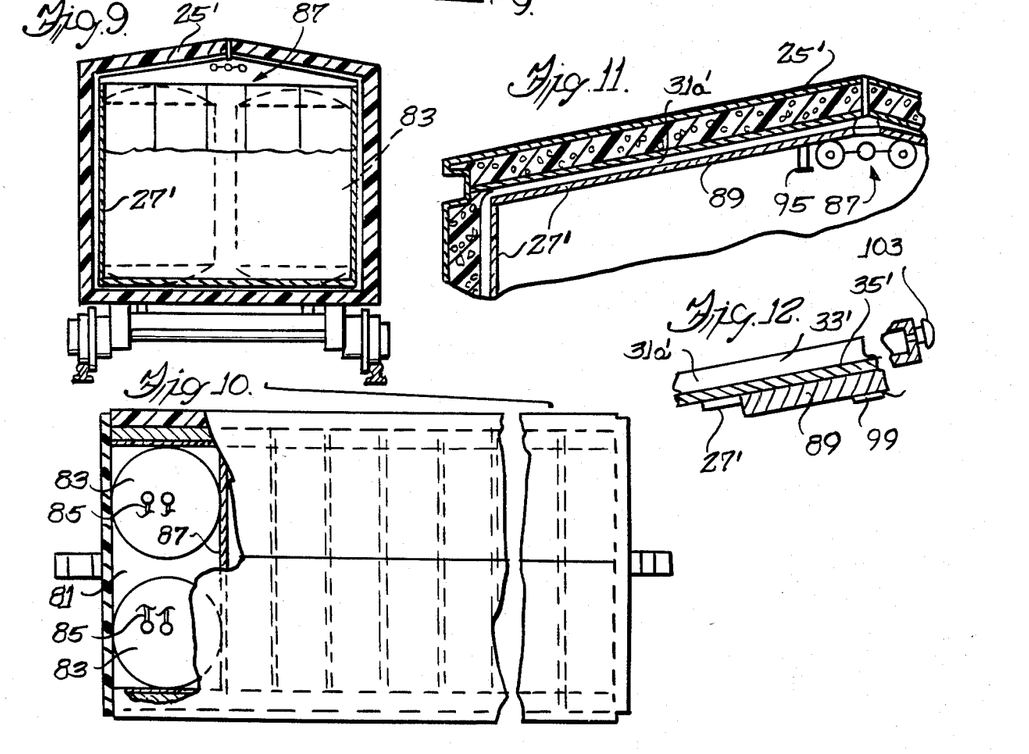
FIG. 9 is a sectional view taken generally along the line 9—9 of FIG. 8.
FIG. 10 is a plan view with portions broken away of the railway car as shown in FIG. 8.
FIG. 11 is an enlarged fragmentary sectional view showing the upper portion of the railway car depicted in FIG. 9.
FIG. 12 is an enlarged fragmentary view showing a portion of the refrigeration system depicted in FIG. 11.

A cryogen holding compartment 81 is provided at the left end of the railway car, as illustrated in FIG. 8, wherein a pair of liquid cryogen tanks 83 are provided. If desired, the tanks 83 can be only lightly insulated so that the compartment 81 will be maintained in a refrigerated condition, thus obviating the need for providing any thermosyphons 31' in the inner wall 82 which forms the compartment. Standard piping 85 is provided to interconnect the cryogen tanks 83 to a cryogen injection system 87 provided in the upper region of the railway car interior. The cryogen injection system 87 is located so as to extend longitudinally generally down the centerline of the car and is hung below an upper longitudinally extending plate 89 made of good heat-conducting material, such as aluminum, which serves as an intermediate heat sink. As best seen in FIG. 12, the strip portions 35' of the thermosyphons are preferably bonded in surface contact to the heat-transfer plate 89 so they are in good heat-conducting relationship therewith. The underside of the heat-transfer plate 89 is cooled by the cryogen injection system 87 which is disposed immediately therebelow.

Figure 13:
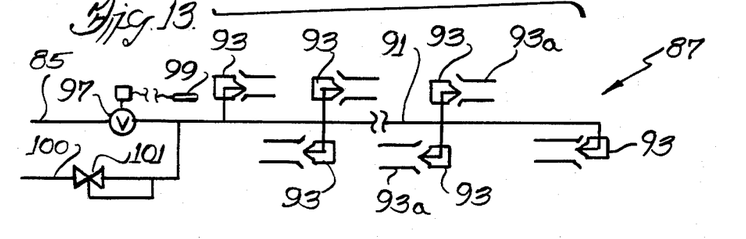
FIG. 13 is a diagrammatic view illustrating the cryogenic cooling system which is employed to create an intermediate temperature heat sink.
Figure 15:
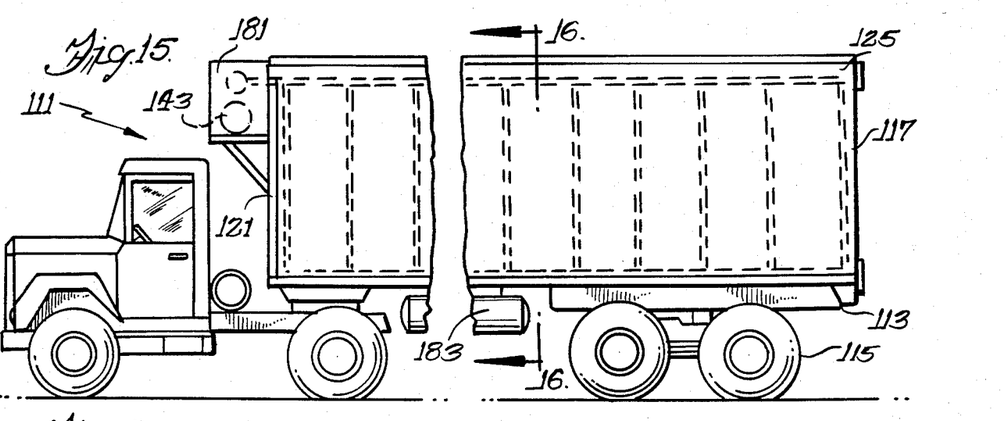
FIG. 15 is a front view of a truck semi-trailer embodying various alternative features of the invention.
Figure 16:
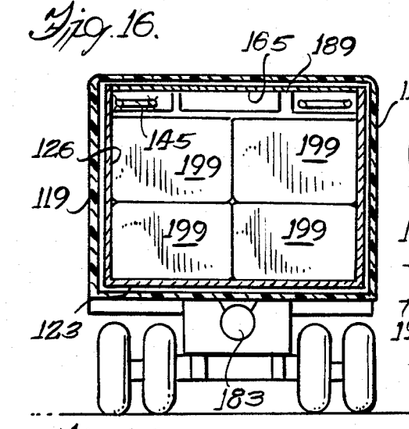
FIG. 16 is a rear sectional view taken generally along the line 16—16 of FIG. 15.
Figure 17:
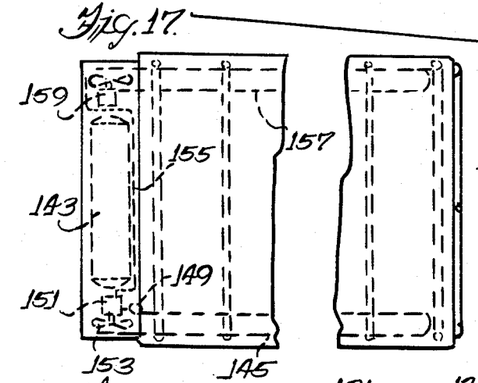
FIG. 17 is a plan view of the trailer truck with portions broken away.
Figure 18:
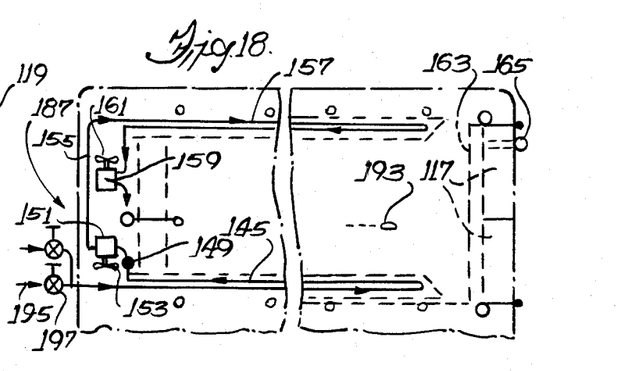
FIG. 18 is a diagrammatic view with the trailer shown in plan outline which illustrates the liquid $CO_2$ vaporization system in greater detail.

As best seen in FIG. 13, the cryogen injection system 87 includes a main header 91 which supplies cryogen to a plurality of injection nozzles 93, each of which is associated with an inducer 93a. Depending bumpers 95 may be provided adjacent each side of the injection system to prevent inadvertent damage during loading and unloading of freight. The bumpers 95 should not interfere with the circulation of cold vapor in the head space of the railway car; however, perforations therein could be provided to assure that this is the case.

A suitable liquid cryogen, preferably either liquid nitrogen or liquid $CO_2$, is provided in the tanks 83 at a desired temperature and pressure. If nitrogen is employed, it is usually maintained at about $-320°$ F. and 100 psig. Liquid $CO_2$ can also be stored at about 100 psig. and a temperature of about $-70°$ F., or at about 300 psig and a temperature of about $0°$ F., or at any intermediate conditions therebetween. Assuming for purposes of discussion that liquid $CO_2$ is employed, the piping system 85 connects a liquid $CO_2$ supply line to the header 91 through a solenoid-controlled valve 97 which can be of the off-on variety or is preferably of the modulating variety as discussed hereinbefore. The valve is controlled by a temperature sensor 99 preferably attached to the undersurface of the heat-transfer plate 89 which opens and closes the valve 97 to maintain its temperature within the desired range. When liquid $CO_2$ is employed, the piping system 85 is used to provide a separate vapor line 100 which is connected through a regulator and integral check valve 101 which is set to maintain approximately 75 psig of $CO_2$ vapor in the header 91 at any period when the valve 97 is closed so that the pressure therewithin does not fall below about 60 psig, lest the creation of $CO_2$ snow and subsequent blockage occur.

When the valve 97 is open, liquid $CO_2$ is fed to all of the nozzles 93 resulting in the spray of a mixture of $CO_2$ vapor and $CO_2$ snow through the inducers 93a, which create a secondary circulation of the atmosphere within the head space and good convection flow along the length of the aluminum plate 89. The inducers facilitate the sublimation of the $CO_2$ snow in the upper region near the surface of the heat-sink plate, and the overall arrangement assures good absorption of heat from the plate and thus maintenance of the intermediate heat sink in the desired temperature range. The vapor which is created as a result of the injection system can be exhausted from the railway car through a separate vent, or it can be allowed to naturally exit through the region of the door 17' which would help to counteract the inflow of heat into the refrigerated storage chamber in this region.

As in the previously described railway car embodiment, the heat sink 89 is maintained at a desired temperature range, usually about 5° to 15° F. below the temperature desired for the lower portions of the thermosyphons 31', which is substantially the intended storage temperature. The thermosyphons are filled with sufficient refrigerant so that, at the intended operating temperature, the bottom portions are filled with the liquid phase and it extends upward in the vertical legs 31b' to provide a depth of at least about 10% of the height. Heat from the thermosyphons is readily transferred from the upper ends of the heat-conducting strip portions 35' which are in contact with the upper surface of the heat-transfer plate 89. Interior fins could also be provided in the upper end region of the tube sections 33' to more efficiently condense the refrigerant vapor. Likewise, the ends of the two sections can be provided with a valve and cap arrangement 103 for periodically checking the refrigerant pressure therewithin and refilling if necessary.

Figure 21:
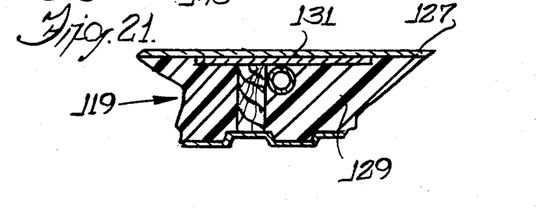
FIG. 21 is an enlarged fragmentary view through a side wall of the semi-trailer.

Shown in FIGS. 15 to 21 is a truck-trailer transport 111 wherein an alternative embodiment of the invention, generally similar to that just described with respect to FIGS. 8 through 14, is incorporated. The truck-trailer 111 includes a subframe 113 and wheel structure 115. A pair of rear doors 117 provides access to the refrigerated enclosure defined by a pair of sidewalls 119, a front end wall 121, a floor 123 and a ceiling or roof 125 wherein the interior storage chamber 126 is located. The walls of the compartment can be fashioned in the same general manner as those of the railway car hereinbefore described and can be finished with an interior plywood skin 127 as illustrated in FIG. 21. The remainder of the walls, floor and roof are then filled with a synthetic polymer foam 129 which is preferably installed by a foam-in-place process.

Thermosyphons 131 are provided adjacent the exterior-facing surface of the plywood skin 127, and they have tube portions 133 and strip portions 135 generally as hereinbefore described. Because it is possible that a trailer-truck could be parked at any angle, the thermosyphons are preferably in the form of complete loops, each having an upper horizontal leg 131a which extends completely across the storage chamber 126, a pair of vertical legs 131b and a bottom leg 131c which extends completely across the floor of the truck-trailer. A heat-conducting metal plate 189 is provided along the entire upper surface of the compartment, made of aluminum or a similar good heat-conducting material. The plate 189 serves as the intermediate heat sink and has its upper surface in good thermal contact with the undersurface of the strip portions 135 of each of the thermosyphon loops 131. The front end wall 121 has several vertical thermosyphons 131 which extend for the full height of the compartment and connect at their upper ends to the upper surface of the heat-transfer plate 189. The rear end wall and the pair of doors 117 are cooled in a slightly different fashion as set forth hereinafter.

A cryogen reservoir 143 is provided in the form of a tank of liquid cryogen in a separate compartment 181 located in an upper position on the front end wall where it might extend forward over the top of the truck cab. Alternatively, a substitute or auxiliary cryogen tank 183 might be provided underneath the floor of the vehicle as disclosed in FIG. 15.

In order to cool the intermediate heat sink provided by the aluminum plate 189, a cryogenic cooling system 187 is employed which generally resembles that disclosed in my earlier U.S. Pat. No. 4,045,972, issued Sept. 6, 1977, the disclosure of which is incorporated herein by reference. More particularly, liquid $CO_2$ is supplied by a supply pipe leading from the tank 143 to an elongated finned evaporator 145 (FIG. 18) located in an upper region of the storage chamber adjacent the underside of the aluminum plate 189. A longitudinally extending baffle 147 protects the finned evaporator from potential damage and creates an elongated passageway for the circulation of the atmosphere within the trailer enclosure so as to cause the evaporation of the liquid cryogen and the convection cooling of the underside of the metallic plate heat sink. The evaporated cryogen vapor passes through a pressure regulator 149 and then enters a first air motor 151 which drives a fan blade 153 which creates the circulation within the baffle 147.

The low-pressure cryogen vapor from the first air motor 151 is routed through a pipe 155 to a second elongated finned heat-exchanger 157 which extends for substantially the length of the truck-trailer on the opposite side of the overhead aluminum plate 189, and a baffle 147a provides a similar passageway and shield about this heat-exchanger. Circulation of the compartment atmosphere through this baffle passageway is created by a second air motor 159 which drives a second fan blade 161 and which is powered by the further expansion of the cryogen vapor to a still lower pressure.

The low-pressure cryogen vapor exhaust from the second air motor 159 is routed through a conduit (not shown) to a conduit network 163 which circles about and surrounds the opening in the rear end wall wherein the pair of doors 117 are located. It is finally exhausted to the atmosphere through a rear vent 165; however, a portion or all of it could be vented into the storage chamber 126 and subsequently vented from another location at the opposite end of the trailer truck body if it were desired to provide a cryogen atmosphere therewithin. However, for safety purposes, it is sometimes preferable to vent this non-oxygen containing atmosphere exterior of the compartment wherein workmen will enter when loading or unloading cargo.

Figure 19:
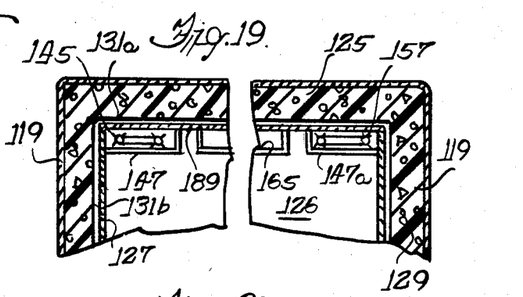
FIG. 19 is an enlarged fragmentary sectional view of the upper portion of the truck enclosure illustrating certain features of the refrigeration system.
Figure 20:
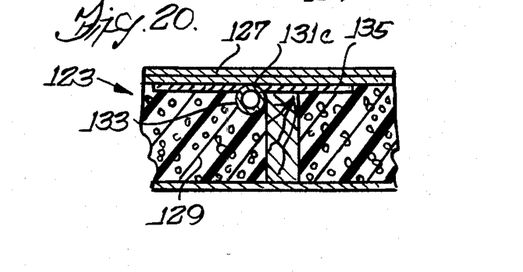
FIG. 20 is an enlarged fragmentary view through the floor of the truck trailer.

As best seen in FIG. 19, an opening 165 is provided in the upper portion of the front end wall 121 of the trailer. Similar openings are provided forward of the two baffles 147 and 147a. This arrangement allows the fans on the air motors 151 and 159, which are located in the compartment 181, to take suction from the interior of the trailer and then discharge this atmosphere longitudinally through the elongated passageways created by the baffles. This overall arrangement assures that there is a substantially continuous circulation of the cold atmosphere within the enclosure along the undersurface of the aluminum plate 189.

The temperature of the plate is continuously monitored by a temperature sensor 193 which suitably controls a valve 197 (either off-on or preferably proportioning) in a $CO_2$ supply line 195. Accordingly, when the temperature of the plate 189 rises above the desired temperature range for the heat sink, the valve is caused to open to allow a greater flow of liquid $CO_2$ therethrough to lower it accordingly. The greater the flow rate of cryogen through the overall cryogen vaporization system, the greater is the amount of cryogen vapor created in the elongated evaporator 145, the greater is the circulation of the atmosphere within the transport enclosure by the air motors, and the greater is the convection transfer of heat from the undersurface of the aluminum plate 189 to the cryogen in the evaporator 145 and the elongated heat-exchanger 157. Just as in the aforementioned railroad car system depicted in FIGS. 8 through 13, the above-described system is effective to maintain the upper horizontal legs 131a of the thermosyphons within a desired temperature range. The confined refrigerant vapor therewithin is condensed in the upper horizontal leg and flows downward to the lower horizontal leg through the vertical legs 131b regardless of the orientation of the truck-trailer at the moment, demonstrating the effectiveness of the continuous loop arrangement of the thermosyphons 131. Depending upon the refrigerant employed, at operating temperatures the liquid phase may have a depth of about twothirds to three-fourths of the height of the vertical legs. So as to avoid too great a temperature differential because of the liquid head in the thermosyphons, a refrigerent having a density not greater than about 75 lbs./cu. ft. (1.2 g/cc.) is preferably chosen.

Figures 22, 23, 24, 25, 26:
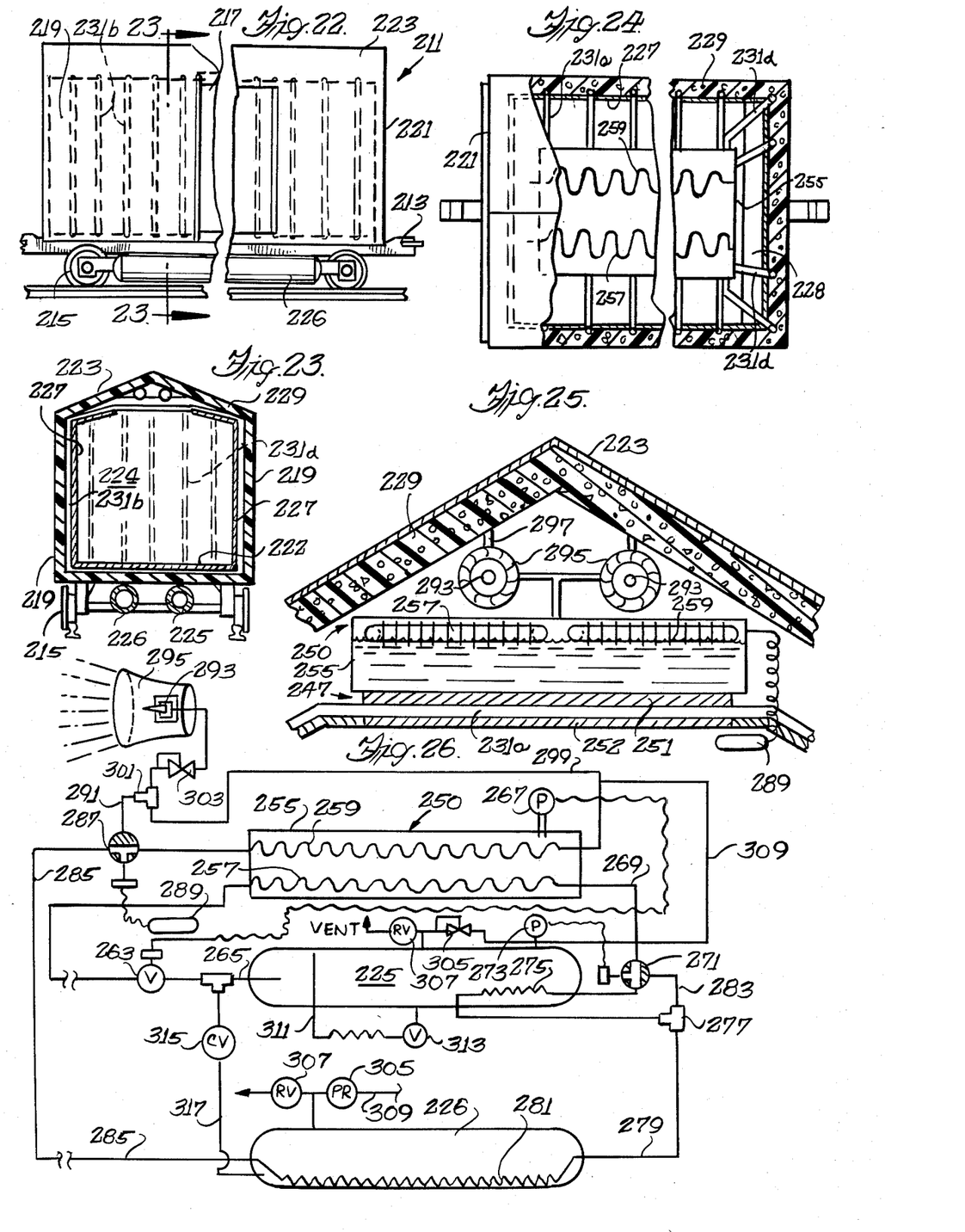
FIG. 22 is a fragmentary front view of a further alternative embodiment of a railroad car embodying various features of the invention.
FIG. 23 is a sectional view of the railroad car in FIG. 22 taken generally along the line 23—23.
FIG. 24 is an enlarged plan view, shown partially in section and partially broken away to illustrate some details of the refrigeration system in the ceiling of the car.
FIG. 25 is a further enlarged fragmentary sectional view with portions broken away showing the details of the heat sink.
FIG. 26 is a schematic view of the $CO_2$ refrigeration system by which the temperature of the upper heat-sink reservoir is regulated by heat-exchange with $CO_2$ from lower $CO_2$ storage vessels.

Illustrated in FIG. 22 et seq. is a railroad car 211 of generally standard construction having a subframe 213, a wheel assembly 215 and a door 217. The car is designed to serve as a refrigerated transport, and thus all boundaries which constitute the enclosure wherein the refrigerated load will be located are provided with thermal insulation. In this respect, the car 211 has a pair of side walls 219, a pair of end walls 221 and a floor 222 which is mounted on the subframe 213 and a peaked roof 223.

A pair of $CO_2$ storage vessels 225, 226 are hung between the wheels of the car. The entire product storage chamber 224 is defined by an interior skin 227, which constitutes the interior surface of the floor 222, the side and end walls 219, 221, and also forms a ceiling below the roof which can be provided with openings 228 at each end for a purpose described hereinafter. The skin 227 may be of plywood, metal flooring material, corrugated plastic sheeting or the like. The exterior surface of the car 211 may be of any standard material, with the intermediate region between it and the skin 227 being filled with thermal insulation material 229, preferably a synthetic resin foam or some other type well known in the insulation art. Heat attempting to flow into the insulated chamber 224 is intercepted in the same manner as heat attempting to enter the insulated chamber in FIGS. 8 through 13, i.e., by thermosyphons 231.

In the railroad car 211, a plurality of thermosyphons 231 are employed which, as previously described, may be individually formed in the shape of a box "O" having an upper generally horizontal leg 231a, a pair of vertical legs 231b and a lower horizontal leg 231c for those associated with the side walls 219. The thermosyphons associated with the end walls 221 preferably have only a vertical leg which is connected to an upper extension 231d that is in contact with the heat sink. As previously described, each thermosyphon is in the form of a composite tube-strip wherein the tube carrying the vaporizable liquid is connected by a good heat-conducting bond to a metal strip or plate having relatively high thermal conductivity, such as copper. As previously described, the strip portion is placed between the structural members of the floor or wall and the skin so as to intercept the heat attempting to short-circuit the insulation.

A heat sink 247 is provided in the region above the ceiling and includes an elongated rectangular heat exchanger 250 having a length which might be nearly the length of the railway car, a width of, for example, two to three feet, and a height or depth of four to five inches. The bottom of this heat-exchanger is preferably in thermal contact with a heat-conducting plate, such as an aluminum plate 251, against which the upper portions of all of the thermosyphons 231 are in thermal contact. If desired, a second heat-conducting plate 252 can be optionally utilized below the thermosyphons 231, and the assembly of the upper plate 251, the thermosyphon legs 231a and the lower plate 252 can all be held together in thermal contact by threaded fasteners or the like. By making the flat heat-exchanger 250 of sturdy aluminum material, it is possible to also dispense with the upper heat-conducting plate 251 and simply thermally bond the upper horizontal legs 231a and the extensions 231d directly to the bottom of the heat-exchanger.

Generally, the heat-exchanger 250 contains an outer shell 255 which provides a generally open region through which a pair of tubes 257 and 259 run from end to end. The tubes 257,259 are preferably sinuous in shape and may be provided with exterior fins to increase the heat transfer area. The otherwise open area interior of the shell is filled to a desired depth, e.g., about 70%, with a liquefied gas, such as a halogenated flurocarbon, e.g., R-12, R-22, or R-502. The heat-exchange tubes 257,259 are preferably located in the upper portion of the shell 255 so that a major portion of each lies in the vapor head space. Because a transport vehicle such as a railway car will sometimes be subjected to uneven positions, the use of such a liquefied gas at equilibrium is advantageous in order to maintain the heat-exchanger 250 substantially isothermal throughout because of the inherent property of a liquefied gas under equilibrium conditions.

The cryogen reservoir is provided by the two tanks 225 and 226 located below the floor of the car, and both of these tanks may be filled with liquefied $CO_2$ or some other suitable cryogen. Preferably, the tank 225 is filled with liquefied $CO_2$, and the tank 226 is filled with $CO_2$ slush. For ease of reference, they are hereinafter referred to as the main tank 225 and the secondary tank 226. The main tank may be filled with liquefied $CO_2$ under about 125 psig so that its temperature will be about $-45°$ F. ($-42.8°$ C.). The secondary tank 226 is preferably filled with $CO_2$ slush at the triple point of $CO_2$, i.e., $-69.9°$ F. ($-56.6°$ C.) and a pressure of about 60 psig.

The cryogenic refrigeration system is controlled by a main control valve 263 located in an exit line 265 from the tank 225, and this control valve may be either of the off-on or of the modulating variety. The control valve 263 is opened or closed appropriately in order to maintain the desired conditions on the shell-side of the heat-exchanger 250. Any suitable type of pressure- or temperature-sensing device can be used, and in the illustrated embodiment a pressure sensor 267 is connected to the heat-exchanger shell 255 to monitor the pressure therewithin and open or close the valve 263 accordingly by a suitable control line.

The heat-exchanger is maintained at an appropriate temperature to achieve the desired storage temperature for the particular load being transported, and when frozen food is being transported, the storage temperature may be maintained at about 0° F. ($-17.8°$ C.) or 5° to 10° F. When the pressure sensor 267 detects a rise in pressure thereabove the set point, the main control valve 263 is opened allowing high-pressure liquid $CO_2$ to flow through the line 265 which leads upward to the heat-exchange coil 257 in the heat-exchanger 250 driven by differential pressure. When the liquid $CO_2$ reaches the coil 257, it absorbs heat from the fluid in the shell side of the heat-exchanger lowering the temperature of the fluid refrigerant and vaporizing the $CO_2$. This continues until the desired equilibrium pressure is reached on the shell side, and the pressure sensor 267 then causes the main control valve 263 to close.

The $CO_2$ vapor which is created in the heat-exchange tube 257 and that which is displaced as a result of the entry of the liquid $CO_2$ flows through a return line 269 which leads downward to a three-way valve 271. The three-way valve is controlled by a pressure sensor 273 which monitors the pressure of $CO_2$ within the tank 225, and if this pressure falls below a desired value, e.g., 115 psig, it directs the flow of returning vapor to a pressure-building coil 275 located in the bottom of the tank 225. The flow of the warm $CO_2$ vapor through the liquid in the tank 225 causes liquid $CO_2$ to vaporize and rebuild the desired minimum pressure of about 125 psig within the tank. The cooler vapor exiting the coil 275 flows through a tee 277 and then through a line 279 leading to a heat-exchange coil 281 located on the bottom of the $CO_2$ slush tank 226. As soon as the desired pressure is rebuilt in the tank 225, the three-way valve 271 is shifted so as to direct the returning $CO_2$ vapor through a line 283 leading directly to the tee 277.

The warm $CO_2$ gas from the conduit 279 is cooled and condensed in the coil 281 by the $CO_2$ slush which is at a temperature of about $-69.9°$ F., gradually reducing the percentage of solid $CO_2$ in the slush. The now-condensed liquid $CO_2$ exits through an outlet line 285 leading back upward to a three-way valve 287 located generally adjacent the heat-exchanger 250 in the upper region of the railway car. The three-way valve 287 is controlled by a temperature sensor 289 located in a suitable space near the ceiling of the insulated enclosure. The three-way control valve 287 may be set to shift when a temperature above about 0° F. to 10° F. is detected so as to maintain a proper storage temperature for frozen foods in the upper region of the insulated enclosure. When the sensor 289 detects a temperature above the desired storage temperature, it shifts to divert the flow of liquefied $CO_2$ to a by-pass conduit 291 leading to a pair of spring-loaded nozzles 293 located within a pair of inducers 295. The $CO_2$ is ejected from the spring-loaded nozzles 293 at high velocity, and the construction of the inducers stimulates the flow of the atmosphere adjacent the nozzle, working generally in the fashion of a jet pump. A more detailed description of the nozzles and inducers is set forth in U.S. Pat. No. 4,344,291, issued Aug. 17, 1982. The nozzle-inducer combinations can be supported by suitable brackets 297 depending from the roof of the car, as depicted in FIG. 25, or optionally they might be disposed below the heat-exchanger 250. When they are located in the illustrated region, the openings 228 at each end of the ceiling of the car allow for a pattern of flow of atmosphere from one end of the car to the other in the region above the ceiling and in the reverse direction in the region therebelow.

As soon as the atmospheric temperature being sensed falls below the set point, the three-way control valve 287 shifts to cause the returning liquid $CO_2$ to flow through the heat-exchange tube 259 where it again turns to vapor, picking up heat from the liquefied gas on the shell-side of the heat-exchanger. The vapor exiting from the coil 259 flows through a line 299 to a tee 301 in the line 291 leading to the nozzle-inducer combination, and thus this vapor is also ejected into the atmosphere at the top of the car so as to contribute to the refrigerating effect for this region. The line 299 contains a back pressure regulator 303 which is set to maintain a minimum pressure of at least about 75 psig throughout the system and thereby prevent any $CO_2$ snow from forming therein.

Thus, it can be seen that the $CO_2$ flowing through the line 285 has alternative paths which it can follow so as to balance the amount of refrigeration which is provided to the ceiling region, by ejection through the nozzle-inducer combination, with that which is provided to the side walls, end walls and floor area, by cooling the shell-side of the heat-exchanger 250 (which is in contact with the heat sink plate 251, with which the upper portions of the thermosyphons 231 are in thermal contact). Of course, it can be seen that all of the $CO_2$ passing through the line 285 is eventually used to provide refrigeration to the ceiling region of the car; however, when it first traverses the heat-exchange coil 259 wherein it is vaporized, the refrigeration capacity which it has left to supply through the nozzle-inducer combinations is much less.

Both tanks 225 and 226 are provided with the typical safety and release systems. In the illustrated embodiment, both are provided with a pressure regulator 305 and a relief valve 307. The regulator, which may be set at about 150 psig, connects to a line 309 which joins the line 299, and thus any overpressure in the tank 225 causes $CO_2$ vapor to be relieved through the spring-loaded nozzle 293, resulting in additional atmospheric movement within the ceiling portion of the refrigerated enclosure. If for some reason the regulating valve 305 is unable to relieve the overpressure, the relief valve 307, which might be set at about 160 psig, vents the tank to a safe pressure. A gas line (not shown) can also be run from the top of the tank 225 to downstream of the regulator 303 which would contain a downstream pressure regulator similar to the regulator 101 described hereinbefore to achieve the same purpose. In addition, a further pressure-building system 311 of the normal type is provided in association with the tank 225. A valve 313 opens should the tank pressure drop below about 110 psig, a pressure below that at which the pressure sensor 273 is set, so as to use atmospheric heat to vaporize some cryogen from the tank and return the vapor to the head space to increase the tank pressure to the desired minimum.

After the transport is in operation over a few days' time and depending upon the temperature environment encountered, the liquid $CO_2$ in the tank 225 will be gradually exhausted, whereas at the same time the solid content of the $CO_2$ slush in the tank 225 will approach zero as it takes up heat in condensing the returning vapor flowing through the coil 281. As a result, the temperature and pressure within the tank 226 will then begin to slowly rise, and eventually it will reach the equilibrium pressure in the tank 225. At this point in time, a check valve 315 in a line 317 leading from the bottom of the tank 226 opens, and liquid $CO_2$ will thereafter flow through the main control valve 263 from both tanks 225 and 226.

One of the principal benefits of this system is the dramatic reduction in both the weight and volume of cryogen which must be carried in-transit to achieve a given amount of refrigeration in an insulated enclosure. This advantage is of course primarily derived from the superior refrigerating quality of the solid portion of the $CO_2$ slush. Should still additional refrigeration capacity be desired for a particular transport, a third or even a fourth tank of cryogen slush could be provided. Such an arrangement would operate as herein described until the first tank was substantially exhausted and the contents of the second tank had been turned entirely to liquid $CO_2$, its pressure having risen to, for example, 120 or 125 psig. At this point, a valving arrangement could be actuated so as to connect the third slush-containing tank with the second tank so that, thereafter, the role of the second tank would be reversed, with it serving to supply liquid $CO_2$ to the heat-exchanger 250 while the solid $CO_2$ content of the slush in the third tank is gradually diminished. Such a process can be repeated successively until all of the cryogen tanks have been emptied.

The invention provides cryogenic cooling of a transport in a manner which is particularly effective in being able to utilize substantially all of the cargo space provided within a transport. As illustrated, for example, in FIG. 16, the load need not be supported on wooden pallets or the like which would provide a passageway for air circulation between adjacent loads, but instead palletized loads 199, supported on corrugated fiberboard slip sheets or the like, can be employed in order to allow the interior of the truck-trailer enclosure to be tightly packed with loads of frozen food or the like because the incoming heat is intercepted in the walls themselves and in the floor. An important advantage comes from the manner in which the interception occurs without in any way weakening the boundary members of the enclosure by the necessity to provide hollow passageway-forming regions through which atmosphere can be circulated. This advantage remains regardless of whether mechanical cooling or cryogenic cooling is employed. When cryogenic cooling is used, the control of the temperature of the intermediate heat sink is valuable in extending the period of time the cryogen reservoir will be effective, by maintaining a precise storage temperature instead of inefficiently attempting to maintain a temperature lower than necessary and rapidly expending cryogen in such an attempt.

Although the invention has been described with regard to four different preferred embodiments, it should be understood that various changes and modifications as would be obvious to one having the ordinary skill in this art may be made without departing from the scope of the invention which is defined solely by the claims appended hereto. Particular features of the invention are emphasized in the claims which follow.

What is claimed is:

1. A refrigerated transport comprising
   means defining an insulated enclosure including a plurality of walls and a floor for holding a quantity of product at a storage temperature below ambient temperature, and including opening means for inserting and removing said product,
   means for holding a cryogen reservoir,
   thermosyphon means in heat-transfer relationship with said walls and floor containing a vaporizable refrigerant which exhibits liquid-vapor two-phase form at about said storage temperature and at an equilibrium pressure not greater than 500 psia.,
   intermediate heat sink means in heat-transfer relationship with upper portions of said thermosyphon means, and
   means for controlling the transfer of heat from said intermediate heat sink means to said cryogen to maintain said heat sink means at a desired temperature below said storage temperature but substantially above the temperature of said cryogen reservoir, whereby heat attempting to enter said enclosure is intercepted by said thermosyphon means, transferred to said intermediate heat sink and ultimately absorbed by said cryogen.

2. A transport in accordance with claim 1 wherein said control means maintains said intermediate heat sink means at a temperature not more than about 15° F. below said storage temperature.

3. A transport in accordance with claim 1 wherein said thermosyphon means has a generally horizontal bottom leg connected to a generally vertical leg and, at its operating temperature, contains an amount of said refrigerant in liquid phase equal to the volume of said horizontal leg thereof plus a depth of a least about ten percent of the vertical leg thereof.

4. A transport in accordance with claim 1 wherein said thermosyphon means includes a closed refrigerant-containing tube connected by a good thermal-conducting bond to elongated plate means of good thermal conductivity.

5. A transport in accordance with claim 4 wherein said plate means is located adjacent a load-bearing member of said enclosure to intercept heat flowing toward the interior thereof through said member.

6. A transport in accordance with claim 1 wherein said reservoir means includes a holder for a mass of solid $CO_2$ and wherein said holder is thermally linked to said heat sink means.

7. A transport in accordance with claim 6 wherein said heat sink means includes upper and lower legs with a vaporizable refrigerant confined within and wherein said upper portions of said thermosyphon means are mechanically connected to said lower heat sink leg to provide a good heat-flow path thereto.

8. A transport in accordance with claim 7 wherein said upper and lower legs are part of a complete loop with thermostatically-controlled valve means controlling upward vapor flow at each end of said loop and with a valve-controlled interconnection located generally centrally between said ends for liquid flow downward to said lower leg.

9. A transport in accordance with claim 1 wherein said cryogen reservoir includes vessel means for holding liquid cryogen, means in a top region of said enclosure for vaporizing said cryogen to cool said heat sink means and thermostatic-controlled conduit means interconnecting said vessel means and said vaporizing means.

10. A transport in accordance with claim 9 wherein said heat sink means includes plate means having good thermal conductivity in an upper region thereof which is in thermal contact with upper portions of said thermosyphon means.

11. A transport in accordance with claim 10 wherein said cryogen vaporizing means sprays cryogen into a region adjacent said heat-sink plate means so as to extract heat therefrom and wherein means is provided for monitoring the temperature of said plate means and adjusting the flow of cryogen being vaporized in accordance therewith.

12. A transport in accordance with claim 9 wherein said cryogen vaporizing means vaporizes said cryogen in within an elongated evaporator disposed adjacent said heat-sink means and circulates the atmosphere within said enclosure to transfer heat from said heat-sink means to said elongated evaporator.

13. A transport in accordance with claim 1 wherein said heat sink means includes a heat-exchanger having a liquified gas refrigerant confined therewithin and wherein means are provided for causing a controlled flow of cryogen from said reservoir through said heat-exchange means to cool said confined refrigerant.

14. A transport in accordance with claim 13 wherein said cryogen reservoir includes first vessel means for holding liquid cryogen and second vessel means for holding cryogen slush, thermostatic-controlled conduit means interconnecting said first vessel means and an inlet to said heat-exchanger, and means connected to an outlet from said heat-exchanger for causing vaporized cryogen therefrom to flow through said second vessel means wherein it is condensed by melting solid cryogen in the slush.

15. A transport in accordance with claim 14 wherein said heat sink means includes plate means having good thermal conductivity in an upper region of said insulated enclosure which is in thermal contact with upper portions of said thermosyphon means and with said heat-exchanger.

16. A refrigerated transport comprising
   means defining an insulated enclosure including a plurality of walls and a floor for holding a quantity of product at a temperature below ambient temperature, and including opening means for inserting and removing said product,
   means for holding a cryogen reservoir and including first and second tanks, said second tank being adapted to contain cryogen sluch,
   thermosyphon means in heat-transfer relationship with said walls and said floor,
   intermediate heat sink means in heat-transfer relationship with upper portions of said thermosyphon means, and
   means for controlling the flow of liquid cryogen from said first tank to said intermediate heat sink means where vaporization occurs, then to said second tank where condensation occurs and then back to said heat sink means where revaporization occurs, whereby heat attempting to enter said enclosure is intercepted by said thermosyphon means, transferred to said intermediate heat sink means and ultimately absorbed by said cryogen.

17. A transport in accordance with claim 16 wherein said reservoir means includes means for interconnecting said first and second tanks so that, when the liquid cryogen reservoir in said first tank is substantially exhausted, liquid cryogen is supplied to said heat sink means from said second tank.

18. A method of maintaining product in refrigerated condition within an insulated transport enclosure having a plurality of walls and a floor for holding a quantity of product and including opening means for inserting and removing said product, which method comprises
   providing a cryogen reservoir,
   providing intermediate heat sink means in an upper region of said transport,
   controlling the transfer of heat from said intermediate heat sink means to said cryogen to maintain said heat sink means at a desired temperature, and
   employing a confined vaporizable refrigerant to remove heat from said walls and floor and to transfer said removed heat to said heat sink means, whereby heat attempting to enter said enclosure is intercepted, transferred to said intermediate heat sink and ultimately absorbed by said cryogen to maintain said product in refrigerated condition.

19. A method in accordance with claim 18 wherein said cryogen reservoir includes a first vessel containing liquid cryogen and a second vessel containing cryogen slush and wherein liquid from said first vessel is vaporized to cool said heat sink means, the vapor is condensed in said second vessel and the condensate is revaporized to further cool said heat sink means.

20. A refrigerated transport comprising means defining an insulated enclosure including a plurality of walls and a floor for holding a quantity of product at a storage temperature below ambient temperature, and including opening means for inserting and removing said product,
   thermosyphon means in heat-transfer relationship with said walls and said floor containing a vaporizable refrigerant which is in a two-phase liquid-vapor form at about said storage temperature of said product,
   said floor including elongated structural members which provide support for the product held within said transport enclosure and elongated plate means of good thermal conductivity disposed atop said structural members,
   said thermosyphon means includes a closed refrigerant-containing tube connected by a good thermal-conducting bond to said elongated plate means, and
   means including a vaporizable cryogen for maintaining the temperature of upper portions of said thermosyphon means at a desired temperature below said storage temperature, whereby heat attempting to enter said enclosure is intercepted by said thermosyphon means causing refrigerant vapor to be formed which rises in said closed tube and ultimately transfers the intercepted heat to said cryogen to cause vaporization thereof.

* * * * *